United States Patent

[11] 3,592,331

[72] Inventor Charles H. Morgan
R.F.D. #1 Box 153, Springfield, S.C. 29146
[21] Appl No 788,130
[22] Filed Dec. 31, 1968
[45] Patented July 13, 1971

[54] WATERMELON HARVESTING MACHINE
13 Claims, 10 Drawing Figs.

[52] U.S. Cl............................................. 198/115, 214/522
[51] Int. Cl....................................................... B65g 37/00
[50] Field of Search............................................ 198/113–115, 87; 214/83.1

[56] References Cited
UNITED STATES PATENTS

| | | | |
|---|---|---|---|
| 278,131 | 5/1883 | Grove et al. | 198/114 |
| 785,400 | 3/1905 | Buchanan | 198/87 |
| 1,607,601 | 11/1926 | Behnke et al. | 198/114 |
| 2,699,877 | 1/1955 | Huston | (214/83.1 UX) |
| 2,782,943 | 2/1957 | Jones et al | 198/113 X |

Primary Examiner—Gerald M. Forlenza
Assistant Examiner—Frank E Werner
Attorney—Burns, Doane, Swecker and Mathis ABSTRACT: A mobile harvesting machine including a chassis with articulated conveyor frames mounted on opposite sides. Each conveyor frame includes inner and outer sections which are movable between laterally extended and folded positions. In order to accommodate for variations in terrain, the frames may be raised while the sections are extended and remain in substantial longitudinal alignment. A cable and pulley system supports each frame and controls its folding and terrain accommodating movement. A single feeding conveyor belt is associated with each frame and has a concave cross section to cradle produce while transporting it to inclined conveyors on the chassis. The inclined conveyors include concave belts and flexible cleats that aid in moving the produce to a storage platform. A plurality of turning rollers are employed to transfer produce from the feeding belts to the inclined conveyors.

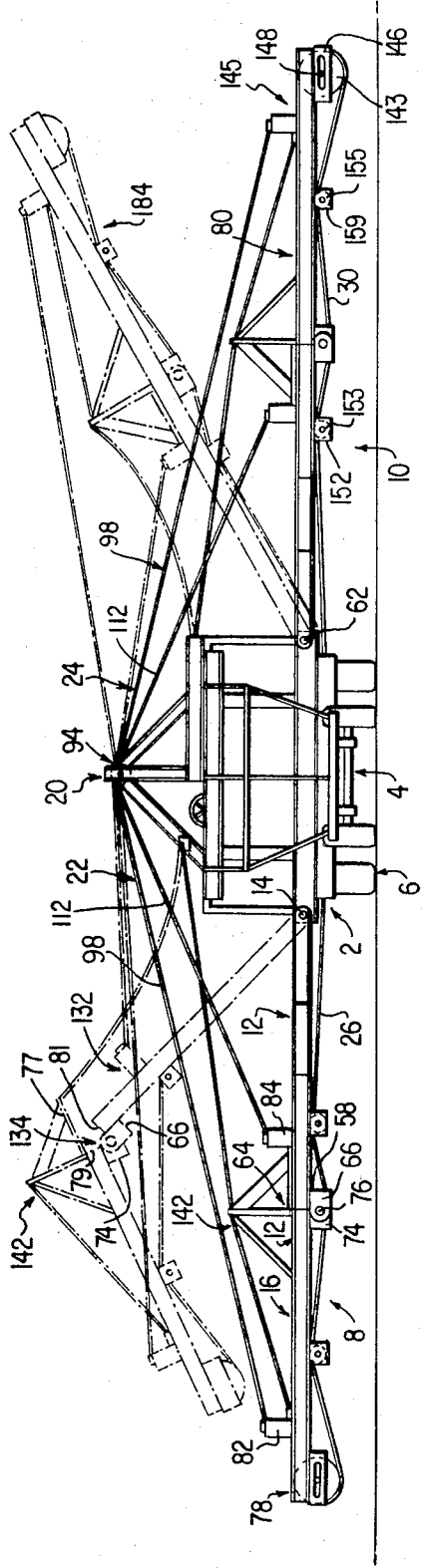
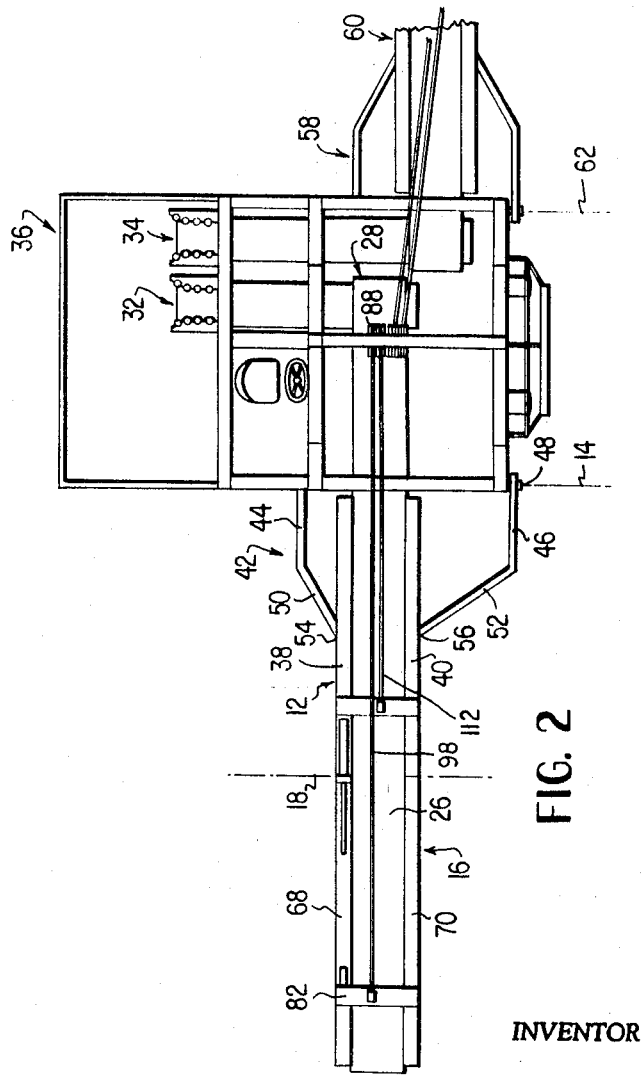

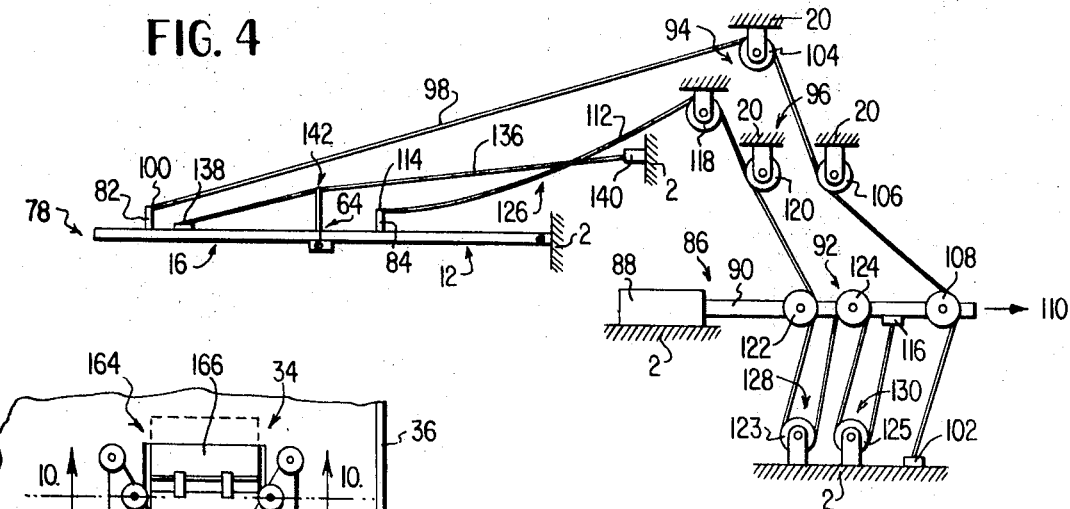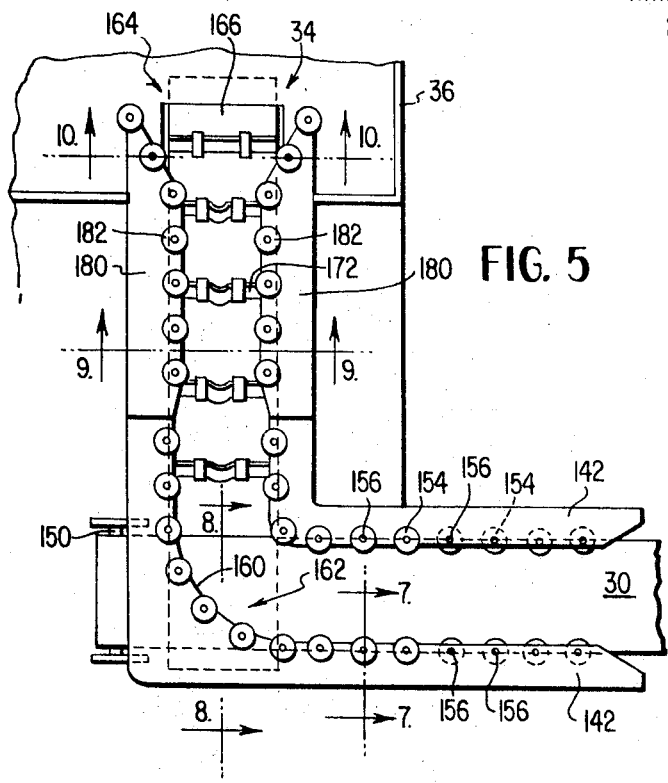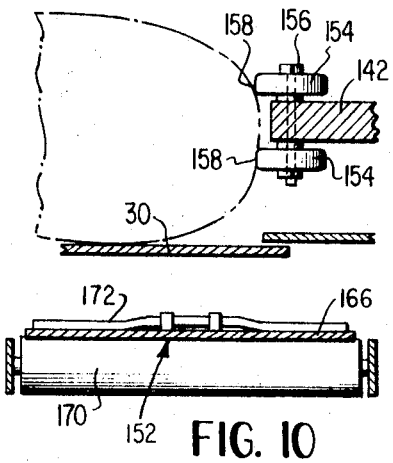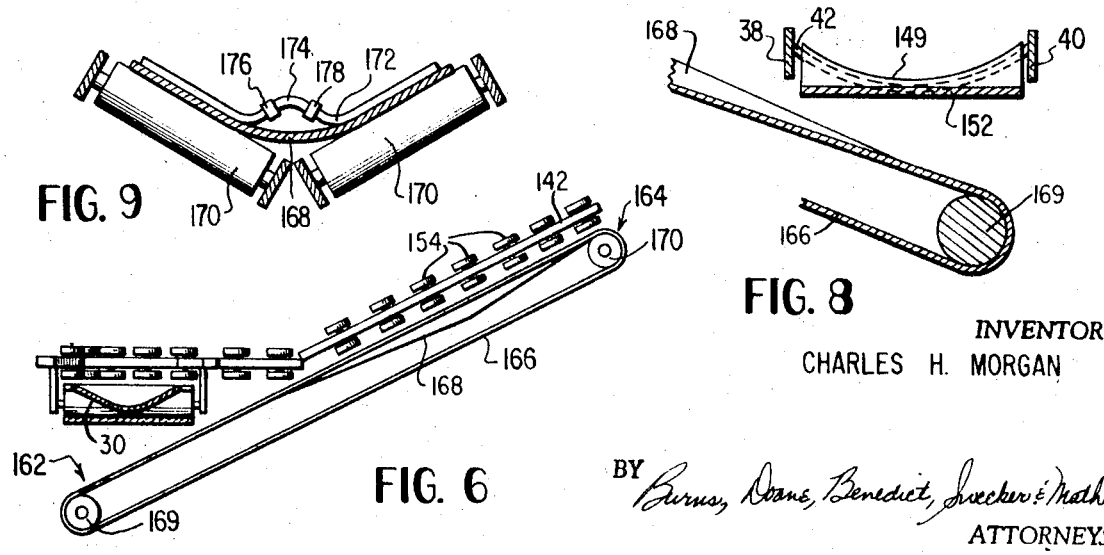
INVENTOR
CHARLES H. MORGAN
BY Burns, Doane, Benedict, Swecker & Mathis
ATTORNEYS

WATERMELON HARVESTING MACHINE

BACKGROUND OF THE INVENTION

This invention relates to mobile harvesting machines. In particular, this invention relates to harvesting machines for conveying produce from laterally spaced locations on opposite sides of a vehicle chassis to a storage bin on the chassis.

Certain crops such as melons are difficult to harvest because they grow on vines rather than well defined rows. As a result, melons, such as watermelons are harvested by hand. The workers must carry the melons to a road through the field. It is then necessary to lift the watermelon up to a truck. The truck cannot drive over the vines because this would destroy the melons that are maturing on the vines. Thus, the harvesting of melons is typically a slow and laborious process.

One conventional harvesting machine includes two feeding conveyor frames that may be extended over rows of produce. Produce loaded on these conveyors is carried by belts to an inclined conveyor for delivery to a trailing vehicle. When not in use, the sections of the feeding conveyor frames may be folded against the harvester frame.

Although harvesters of this type described may often be adequate, they may sometimes prove unsatisfactory for a number of reasons.

For example, no provision is made for angular adjustment of the extended feeding conveyors to accommodate for variations of field terrain. Such an adjustment is highly desirable in order to maintain the feeding conveyors at the most convenient height above the terrain.

Furthermore, since the feeding conveyor sections are folded by pivoting about vertical axes, a separate conveyor belt and driving connection is needed for each section of each frame.

Another disadvantage of the known harvesting machine resides in the fact that the produce may be damaged as a result of uncontrolled movement during conveying. It is especially desirable that watermelons, or other heavy crops, be continuously cradled when conveyed. Additionally, it is desirable to avoid dropping the watermelons when transferring them from a feeding conveyor to an inclined conveyor.

It is also noteworthy that the conventional harvester relies on a cantilever support for the extended feeding conveyors. In watermelon harvesting the feeding conveyors span a great distance and support considerable weight since each melon may weigh as much as 50 pounds. Thus, it would be desirable to provide a suspension system that would support the fully extended feeding conveyor sections at their outer ends.

SUMMARY OF THE INVENTION

It is, therefore, a general object of the invention to provide an improved harvesting vehicle of the type that spans wide areas on opposite sides of the vehicle.

It is a particular object of the invention to provide a produce harvesting apparatus having extensible and foldable feeding conveyors which may be adjusted to accommodate for variations in the terrain of the field being harvested.

It is another object of the invention to provide conveying apparatus for heavy produce, such as watermelons, wherein undesirable movement of the produce during conveying is substantially minimized.

It is still another object of the invention to provide a produce harvesting machine including feeding conveyors and elevator conveyors arranged so that transfer between these conveyors minimizes the possibility of bruising the produce.

It is a further object of the invention to provide a harvesting machine having extensible and foldable feeding conveyors supported at their outer ends by a cable and pulley assembly.

A preferred embodiment of the invention intended to accomplish at least some of the foregoing objects comprises a mobile harvesting machine including a chassis mounted for movement over the ground. Articulated conveyor belt support frame are mounted on opposite sides of the chassis. Each frame is pivotable, when fully extended, about a generally horizontal axis in order to accommodate for variations in terrain. The outer sections of each frame are also pivotable about generally horizontal axes to enable folding of the frame against the chassis.

A single conveyor belt extends around the sections of each articulated frame thereby eliminating the need for a separate belt drive on each frame section.

Produce loaded on these belts is transported to inclined conveyors on the chassis where it is transferred by means of a series of rollers that gradually turn the produce from the feeding conveyors to the elevator conveyors. These elevator conveyors transport the produce to a storage platform at the rear of the chassis for subsequent transfer onto a shipping vehicle.

In order to minimize undesirable movement of the produce, the conveying run of each belt of the feeding and elevator conveyors is tensioned into a concave shape. The produce is thus continuously cradled during transport. Both the elevator conveyors and the feeding conveyors may be provided with a plurality of flexible cleats that aid in moving and supporting the produce. When the belts are tensioned into a concave configuration, the cleats are flexed upwardly so as to form a protrusion for engaging the produce.

Another aspect of the invention is the provision of a cable and pulley system which performs the triple function of supporting the extended feeding conveyor frames, pivoting these sections to accommodate for variations in terrain, and folding the sections adjacent the chassis for highway travel or storage.

DESCRIPTION OF THE DRAWINGS

A harvesting machine constructed in accordance with a preferred embodiment of the invention is illustrated in the accompanying drawings in which:

FIG. 1 is a front elevational view of a mobile harvesting machine according to this invention;

FIG. 2 is a top plan view of the mobile harvesting machine shown in FIG. 1;

FIG. 3 is a partial front view of the mobile harvesting machine in FIG. 1 with one of the feeding conveyor frame assemblies shown in its folded position;

FIG. 4 is a schematic diagram of the cable and pulley assembly of the present invention;

FIG. 5 is a top plan view on an enlarged scale of the feeding and elevator conveyors together with the turning and positioning roller assembly;

FIG. 6 is a side elevational view of the feeding and elevator conveyors shown in FIG. 5;

FIG. 7 is a cross-sectional view of the conveyor taken along the line 7-7 of FIG. 5;

FIG. 8 is a cross-sectional view at the intersection between the feeding and elevator conveyors taken along the line 8-8 of FIG. 5;

FIG. 9 is a cross-sectional view of the elevator conveyor and flexible cleat taken along the line 9-9 of FIG. 5; and FIG. 10 is a cross-sectional view of the elevator conveyor at a point adjacent the storage platform taken along the line 10-10 in FIG. 5.

DETAILED DESCRIPTION

Referring to FIG. 1 of the drawings, a harvesting machine according to a preferred embodiment of the invention includes a vehicle chassis 2 which may be self-propelling. The chassis front and rear wheel and axle assemblies are indicated at 4 and 6.

Extending outwardly from the opposite sides of the chassis are elongated conveyor frame assemblies 8 and 10. These conveyor assemblies are offset longitudinally of the chassis as shown in FIG. 2. The conveyor frame assembly 8 includes an inner frame section 12 pivotally mounted on the chassis for movement about a generally horizontal axis, indicated at 14. Attached to the inner section 12 at the end thereof remote from the chassis is an outer frame section 16. The outer frame section 16 is pivotally connected for movement with respect to the inner frame section 12 and about a generally horizontal axis, indicated at 18 in FIG. 2.

Each of the conveyor assemblies 8 and 10 is supported by a superstructure 20 that extends upwardly from the chassis 2. A plurality of cables and the associated pulley assemblies 22 and 24 on the superstructure 20 provide support for and control the movement of the conveyor frame assemblies 8 and 10.

A single conveyor belt 26 extends along the upper surface of the inner and outer sections 12 and 16 and returns along the undersurface of the articulated conveyor frame assembly 8. The belt 26 also extends partially across the width of the chassis 2 to a position indicated at 28 (FIG. 2). A conveyor belt 30 is similarly mounted on the support assembly 10. Mounted within the chassis 2 are inclined conveyors 32 and 32 which extend from the area beneath the conveyor belts 26 and 30 upwardly to a storage platform 36 attached to the rear of the chassis 2.

In the illustrated embodiment the inner frame section 12 of the frame assembly 8 is constructed of two spaced side members 38 and 40 (FIG. 2). A section of a concave trough (similar to the concave trough 42 shown in FIG. 8 in connection with the frame assembly 10) made of any suitable material, extends between the side members and may be bolted, welded, riveted or otherwise secured thereto.

The pivotal connection between the frame section 12 and the chassis 2 is accomplished by means of a yoke 42 (FIG. 2) having spaced parallel arm sections 44 and 46 extending outwardly from and generally perpendicular to the chassis in substantially longitudinal alignment with the frame section 12 and on opposite sides thereof. The inner ends of the arms 44 and 48 are secured to the chassis by means of a pivot pin 48 as illustrated in FIG. 2. At the ends thereof remote from the chassis, the yoke arm sections 44 and 46 meet arm sections 50 and 52 which converge inwardly toward the frame section 12 and are secured thereto in any suitable manner as indicated at 54 and 56. A substantially identical yoke 58 is employed to connect the inner frame section 60 of the support frame assembly 10 to the chassis 2 for pivotal movement about the generally horizontal axis 62 (FIG. 1). The yoke connections 42 and 58 permit movement of these inner frame sections about generally horizontal axes 14 and 62.

Each of the side members 38 and 40 of the inner frame section 12 includes at the ends 64 thereof remote from the chassis a depending flange 66 extending from the underside 58 thereof for the purpose of pivotally connecting the inner section 12 and the outer section 16 of the support frame assembly 8.

The outer frame section 16 is constructed of two pieces of spaced side members 68 and 70 with a concave trough (not shown) suitably secured thereto. Side members 68 and 70 include, at their inner end 72, a depending flange 74 which mates with the corresponding depending flange 66 of the inner section. A generally horizontally extending pivot bolt 76 passes through the mating flanges to pivotally secure the outer section to the inner section.

As shown in phantom lines in FIG. 1, the positioning of adjacent ends 79 and 81 of the frame section sides, and of the pivot axis, is such that clockwise movement of the outer section 16 with respect to the inner section 12 is prevented by abutment of the ends 79 and 81. Counterclockwise movement is, however, permitted. Therefore, clockwise forces on the outermost portion 78 of the outer frame section 16 are transmitted, by means of pivot bolt 76, to the inner frame sections 12, thereby tending to pivot the entire feeding conveyor support frame assembly 12, in a clockwise direction about the generally horizontal axis 14. It will be appreciated that the inner and outer frame sections remain in substantial longitudinal alignment during this movement.

The inner frame section 60 of the support frame assembly 10 is pivotally connected to the outer frame section 80 for similar movement. The inner and outer sections pivot together in the upward direction, while the outer section is also permitted to rotate downwardly with respect to the inner section.

Also shown in phantom lines in FIG. 1, the outer frame includes a longitudinal projection 77 that overlies the inner frame section 12 when the sections 12 and 20 are in substantial longitudinal alignment. The projection 76 forms part of the base of a tripod assembly 142 over which a folding cable of the system 22 extends.

Extending upwardly from the outer frame section 16 adjacent the outer end 78 thereof, is a generally U-shaped bracket 82 to which one support cable of the system 22, hereinafter described, is attached. A similar U-shaped bracket 84 likewise extends upwardly from the inner frame section 12 adjacent the outer end 64 thereof.

Referring to FIG. 4, a schematic diagram of the cable and pulley assembly 22 which supports and controls the movement of the feeding conveyor frame assembly 8 is there shown.

A cable control mechanism 86 including a fixed hydraulic cylinder 88 and a movable piston rod 90 is mounted on the chassis 2 below the superstructure 20. A pulley block 92 is fixedly secured to the rod 90 and movable therewith.

Two fixed pulley blocks 94 and 96 are mounted on the superstructure 20 adjacent the upper and middle portions respectively thereof. A cable 98 is secured at one end 100 to the bracket 82 on the outer frame section 16, and is fixed at the other end 102 to the chassis.

The cable 98 provides, together with its associated pulleys, the means for adjusting the frame assembly 8 to accommodate for variations in terrain and the means for supporting the frame assembly 8 when the inner and outer sections thereof are in longitudinal alignment. When the frame assembly 8 is in its fully extended position, the cable 98 is in a taut state supporting any downward load exerted by the assembly 8 and any produce thereon.

Between its fixed ends the run of the cable 98 is such that it passes upwardly from the bracket 82 to a pulley 104 on the upper fixed pulley block 94 and then downwardly around a pulley 106 on the middle fixed pulley block 96. Cable 98 then extends further downwardly around a pulley 108 on the movable pulley block 92 mounted on the piston rod 90.

Movement of the piston rod 92 in a direction away from the outer end 78, as indicated by the arrow 110, produces through the first cable 98 a clockwise moment on the frame section 16, thereby resulting in the pivoting of the entire frame assembly 8 about the generally horizontal axis 14 in the manner previously described.

A second cable 112 is secured at one end 114 to the bracket 84 at the outer end 64 of the inner support frame section 12. The other end 116 of the cable 112 is attached to the piston rod 90 and movable therewith.

Between its end 114 and 116, the run of the cable 112 passes upwardly from the bracket 84 to a pulley 118 on the upper fixed pulley block 94, and then downwardly around a pulley 120 on the middle fixed pulley block 96. Afterwards the cable extends downwardly and is looped around between two pulleys 122 and 124 on the movable pulley block 92 and two lower pulleys 123 and 125 that are fixed to the chassis 2.

When the frame structure 8 is in its extended position generally perpendicular to the chassis 2, the cable 112 is slack as indicated at 126 (FIG. 4). It will be appreciated that with the arrangement described movement of the piston rod 90 with respect to the cylinder 88 in the direction of the arrow 110 will cause the cables 98 and 112 to move at different lineal speeds. The reason for this is apparent in that the cable 112 is looped twice at 128 and 130 between two movable pulleys whereas cable 98 passes about only one movable pulley. A given stroke of the piston rod 84 displaces the end 116 of the cable 112 insofar as the lineal path of cable travel is concerned, a greater distance from the frame assembly 8 than the end 102 of the cable 98.

Upon a predetermined movement of the piston rod 90, the initially slack cable 112 overcomes the cable 112 and causes a clockwise moment to be exerted on the outer end 64 of inner section 12 of the assembly 8 which results in the pivotal motion of the outer end about the pivot point 14, as indicated in FIG. 1 by the arrow 132. At this point, the outer frame section moves downward because the inner frame section 12 tends to move about the axis 14 at a greater rate than the outer end 78 of the outer section 16. Any further forces exerted by the first cable 98 on the outer section 16 tend to aid in the folding of the frame assembly 12 since the inner section is continually moving about pivot point 14 at a faster rate.

Eventually the faster moving cable 112 takes the entire load of the frame assembly 8 so that in the absence of further support of the outer section 16, the folding of the assembly may be dangerous due to uncontrolled downward movement of that section about the pivot point 18.

To this end, a folding cable 136 is attached at one end 138 to the forward section 78 of the outer conveyor frame section 16, and at the other end 140 to the superstructure 20. The cable 136 passes over a tripod 142 adjacent the point of joining between frame sections 12 and 16. This cable supports the outer frame section 20 during folding.

It will be appreciated that the cable and pulley assembly for the second conveyor support frame assembly 10 may be substantially identical with that described for the frame assembly 8.

The belt 30 of the frame assembly 8 is supportedly extended around a roller 143 rotatably mounted on the outer portion 145 of the outer frame section 80. The roller may be supported in any convenient manner such as by a pin 148 rotatably received by a depending flange 146 extending downward from the frame section 80.

At a point with the longitudinal confines of the chassis 2, the belt 30 passes over a rotatable drive roller 150 (FIG. 5) that frictionally engages the belt to provide its feeding movement. Between the end of the concave trough 42 on the inner frame section 60 and the roller 150 the belt 30 gradually begins to flatten out as indicated at 152 (FIG. 10).

Uncontrolled movement of a watermelon or other object on the flattened belt is prevented by means of a plurality of rollers 154 mounted on plate members 142 (secured in any suitable manner to the chassis) which run generally parallel to the longitudinal edges of the belt 30.

A plurality of pivot bolts 156 extend generally vertically through the plate members and rotatably receive a roller 154 both above and below the plate members. The peripheries of the rollers 154 extend inwardly of the plate members 142 to overlie the belt 30 so as to engage, as shown at 158 (FIG. 1) any produce that may be jarred toward the plate members.

Adjacent the spacial intersection between the feeding conveyor belt 30 and the inclined conveyor 34, the plate member 142 is gradually curved across the belt 30, as shown at 160. The conveyed produce is turned from the feeding conveyor to the elevator conveyor by means of rollers 154 mounted along that curved portion.

The elevator conveyor 34 is mounted within the chassis 2 and inclined toward the forward end so as to extend, at one end 162, beneath the feeding belt 30. The other end 164, extends up to the storage platform 36 attached to the rear of the chassis. An endless conveyor belt 166 is supported between two rotatably mounted rollers 169 and 170 (FIG. 6), one of which may be a drive roller.

It is desirable that the conveying run of the belt 166 be generally concave, as indicated at 168 so that the watermelon may be cradled during travel to the storage platform. To this end, a plurality of sets of longitudinally spaced rotatably mounted rollers 170 may be used (see FIG. 9). These rollers are inclined downwardly toward each other with sufficient included angles to impart the desired concave cross section to the belt. Alternatively, a concave trough similar to the previously described sheet metal member 42 may be employed.

In order to aid the climb of the melons in their travel on the elevated conveyors 40 and 42, a plurality of flexible cleats 172 are provided. The cleats may be formed by strips of flexible conveyor material that are stretched flat, transversely of the belt and secured to opposite sides thereof. When the conveying portion of the conveyor belt 126 is in its concave configuration 168, the midportions of the cleats are flexed upwardly to provide a raised protrusion indicated at 174, by which a watermelon or the like is supported during its travel up the incline. The flexing of a cleat 172 at its midportion is enhanced by two spaced rings 176 and 178 secured to midportion of the cleat in slightly spaced relation.

Since the elevator conveyor belt 168 flattens out in FIG. 10 as it passes around the roller 170, the flexible material used for the cleats 172 returns to a position generally flat against the belt.

In the illustrated embodiment, two plate members 180 extend along opposite sides of the elevator belt 168 for the purpose of supporting a plurality of rollers 182 that prevent damage of the produce as it moves to the platform. The mounting of the roller 182 on the plate member 180 is similar to that of the rollers 154 and plate members 142. If desired, all the rollers 154 and 182 may be coated with a suitable resilient material, such as rubber, so that the possibility of damage to any produce that engages them is further reduced.

In order to prevent the necessity for adjusting the belt 30 because of the folding movement of the frame assembly 10, a plurality of idle rollers 153 and 154 (FIG. 1) are rotatably mounted in depending flanges 157 and 159 extending from the underneath side of the frame sections 60 and 80. The belt 30 passes between the idle rollers 154 and 156 and the underneath sides of the frame sections. The idle rollers are so spaced that the belt 30 folds and remains on the conveyor without any adjustment necessary with the conveyor assembly in either its folded or extended positions. The optimum spacing for rollers, of course, depends upon the relative lengths of the frame sections.

Controlled movement of watermelon or other produce by the conveyor belt 30 is assured since the rollers 142 and 150 tension the belt into generally conformingly engagement with the trough 42. In this way, the produce is cradled by the concave belt, indicated at 149, as it passes along the feeding conveyor frame assembly 10. It has been found that the conforming engagement of the trough members by the conveyor belt does not result in any appreciable wear either on the troughs or on the belt.

OPERATION

The operation of the harvester is described as particularly applied to the harvesting of watermelons.

With the feeding conveyor support frames in folded position, the harvester may be driven to the watermelon field. At this time retraction of the piston rods to the position illustrated in FIG. 4 permits the articulated sections of the support frames 8 and 10 to be moved by a tension spring 187 having one end fixed to the chassis at 189 (FIG. 3) and the other end fixed to a projection 191 on the inner frame section, to their extended positions, extending generally transversely of the chassis and substantially parallel to the terrain of the field. In the preferred embodiment, the total width of the harvester with the frames in their extended position, is approximately 70 feet. This permits a grower to provide a greater space between the roads through the field since the watermelons may be loaded on the feeding conveyors throughout their length.

Preferably, the height of the extended feeding conveyors above the watermelon field is approximately 3 feet. As the harvester traverses the road and the terrain changes, actuation of the piston rod 90, in the direction of the arrow 110 (FIG. 4) results in a force, exerted by the cable 98, on the outer front frame section 16. The upward force thus provided is transmitted by means of the pivot connection 76 to the pivot connection 14 so that the frame sections 12 and 16 remain longitudinally aligned but pivot together with about the axis 14 to accommodate for hills or the like. It will be appreciated that an additional piston and cylinder assembly and cable arrangement control the movement of the frame assembly 10 in a similar manner. Also it is desirable that each piston be independently operable so that greater flexibility in terrain accommodation will be available.

Melons loaded onto the feeding conveyor belts are transported toward the chassis along the support frame assemblies 8 and 10 and they are continuously supported or cradled as they travel because of the tensioning of the belts into generally conforming engagement with the concave troughs. The great weight on the frame assembly is adequately supported by the cables.

When the melons reach the chassis, if they are jarred by movement of the harvester over bumpy roads, they are protected from damage in that they will engage the rollers 154 spaced on opposite sides of the feeding conveyor belt. It should be noted, that flexible cleats 172 such as those used on the elevator conveyors may also be conveniently employed in connection with the feeding conveyors.

When the melons reach the curved portion 160 of the roller support frame 142, they are gradually turned from the feeding conveyors to the elevator conveyors by means of the rollers 154. The centerlines of the rollers 154 define generally a curved line parallel to the curved portion 160 of the support frame. Use of the turning rollers permits the transfer of the produce from the feeding to the elevator conveyors without the necessity of dropping the produce a great distance and subjecting it to unnecessary damage. A minimum clearance is provided between the feeding and elevator conveyors at the point of intersection of their paths of travel.

The melons are then carried up the inclined elevator conveyor assemblies 32 and 34 to the platform 36 with the aid of the flexible cleats 172 and the protection of rollers 182 extending along the sides of the elevator belts.

The previously mentioned platform 36 is so designed as to accommodate approximately 40 watermelons as they are being transferred to a trailer wagon. For convenience, the trailer wagon may be directly hitched to the harvesting machine by means of a drawbar or any other suitable connecting means (not shown).

The feeding conveyors and the elevator conveyors may be powered by any suitable means such as a series of gearboxes and chain sprockets driven by a belt from the propulsion motor of the chassis (not shown). It is preferred that the drive means for the belts be sufficiently independent from the drive means of the vehicle so that they may be started and stopped independently from machine motion.

Furthermore, the drive for the belts may be conveniently arranged so that different speeds are available. It has been found that approximately 1 foot per second is a practical lineal speed for average harvesting conditions. However, increases in speed to about 3 feet per second are sometimes desirable.

It has also been found desirable to have the elevator conveyors travel at a greater speed than the feeding conveyors, so that congestion at the loading end and conveyor transfer point is substantially eliminated. Such congestion may result in unnecessary damage to the melons.

When harvesting is complete, in order to prepare the harvester for highway travel or for storage, the hydraulic cylinders are then actuated to extend the pistons (a distance greater than the extension involved in the accommodation of terrain differences). The feeding conveyor frames rotate in extended positions to a position 184, as indicated in phantom lines in FIG. 1, where the difference in speeds of the cables respectively attached to the inner and outer sections cause the load from the frame sections to be transferred and thereby results in the pivoting of the outer portion of the frame assemblies downward with respect to the inner section. Further movement of the pistons results in the folding of the conveyor frames as shown in FIG. 3 at 140.

It will be seen that in following the present invention, a mobile harvesting machine which is particularly adaptable for harvesting watermelons is provided.

Of particular significance is the provision of a cable and pulley support system which performs the triple function of supporting the great weight of the extended conveyor constructions, accommodating for variations in terrain, and folding the frame sections adjacent the chassis. The arrangement of the frame sections on the chassis permits the use of a single conveyor belt, rather than separate conveyor belts for each section.

Other advantages are provided by the concave shape of the feeding conveyor belts and elevator conveyor belts with their flexible cleats which provide cradled travel for the watermelons being transported.

A particular advantage in the structure for transferring the produce from the feeding conveyors to the elevator conveyors of the present invention is the substantial elimination of any unnecessary dropping of the produce by means of the feeding conveyor passing over the elevator conveyor and the use of turning rollers.

Further, the method of pivoting the extended conveyor belt support frame sections so that they remain in general alignment within a predetermined degree of pivotal motion is particularly advantageous in accommodating irregular terrain, such as on the side of a hill.

Although the invention has been described with reference to one preferred embodiment, it will be appreciated by those skilled in the art that additions, modifications, substitutions, deletions and other changes not specifically described may be made which fall within the spirit of the invention as defined in the following claims.

I claim:

1. A mobile machine for use in the field harvesting of produce, the machine comprising:

a chassis, means mounting said chassis for movement over the ground, conveyor means mounted on said chassis for transporting the produce from an outwardly spaced position to said chassis, said conveyor means including first and second elongated frame sections, means mounting one end of said first frame section on said chassis for rotation about a first generally horizontal axis, between a lowered position extending transversely of said chassis and a raised position, means mounting one end of said second frame section for swinging movement on the opposite end of said first frame section about a second, generally horizontal axis, between a raised position in substantial longitudinal alignment with said first frame section, and a lowered position generally parallel to said first frame section, means for progressively raising the opposite end of said second section while said first and second frame sections remain in substantially longitudinal alignment and lowering said second frame section relative to said first section by swinging about said second axis while raising said first section by swinging about said first axis, whereby said conveyor sections are adjusted vertically and folded against said chassis, a first movable cable attached to said first frame section, said first cable being slack while said first and second frame sections remain substantially in longitudinal alignment, and a second movable cable attached to said second frame section for supporting the load of said conveyor means while said first and second frame sections remain substantially in longitudinal alignment.

2. A harvesting machine for use in the field harvesting of produce, the machine comprising:

a chassis, means mounting said chassis for movement over the ground, conveyor means mounted on said chassis for transporting the produce from an outwardly spaced position to said chassis, said conveyor means including first and second elongated frame sections, means mounting one end of said first frame section on said chassis for rotation about a first generally horizontal axis, between a lowered position extending transversely of said chassis and a raised position, means mounting one end of said second frame section for swinging movement on the opposite end of said first frame section about a second, generally horizontal axis, between a raised position in substantial longitudinal alignment with said first frame section, and a lowered position generally parallel to said first frame section, means for progressively raising the opposite end of said second section while said first and second frame sections remain in substantially longitudinal alignment and lowering said second frame section relative to said first section by swinging about said second axis while raising said first section by swinging about said first axis, whereby said conveyor sections are adjusted vertically and folded against said chassis, a first movable cable attached to said first frame section, said first cable being slack while said first and second frame sections remain substantially in longitudinal alignment, and a second movable cable attached to said second frame section for supporting the load of said conveyor means while said first and second frame sections remain substantially in longitudinal alignment, said raising means including means for moving said first and second cables comprising a cylinder and piston unit having a movable piston rod, and a pulley assembly mounted on said piston rod, said first and second cables passing over said pulley assembly.

3. A harvesting machine according to claim 2 including:
a third cable having one end attached to said second frame and the other end fixed to said chassis,
an elongated leg attached to said second frame section and extending upwardly therefrom,
said third cable passing over said leg and supporting said second frame section during movement between its raised and lowered positions,
means for moving said second cable at a first rate of speed, and
means for moving said first cable at a second rate of speed greater than said first rate of speed.

4. A mobile machine for use in the field harvesting of produce, the machine comprising:
a chassis,
means mounting said chassis for movement over the ground,
conveyor means for transporting the produce from an outwardly spaced position to said chassis, said conveyor means including a first frame having first and second elongated frame sections,
means pivotally mounting one end of said first frame section on said chassis for rotation about a first axis, between a first position extending generally transversely of said chassis and a second position folded adjacent said chassis,
means pivotally mounting one end of said second frame section for swinging movement on the opposite end of said first frame section about a second axis, between a first position extending transversely from said chassis in substantial longitudinal alignment with said first frame section and a folded second position adjacent said chassis and generally parallel to said first frame section, and
a cable and pulley system for supporting said frame with said first and second frame sections in substantial longitudinal alignment a second cable and pulley system for rotating said first and second frame sections about said first and second axes to folded positions adjacent said chassis,
and power means acting in one direction to move the second cable and continuing in the same direction to move the first cable.

5. A harvesting machine according to claim 4 wherein:
said first axis and said second axis are generally horizontal.

6. A harvesting machine according to claim 4 wherein:
said conveyor means includes a single conveyor belt extending about said first frame section and said second frame secton.

7. A harvesting machine according to claim 4 wherein:
said cable and pulley system includes a cylinder and piston unit having a piston rod, and the
pulley for the respective cables being mounted at spaced points on said piston rod and having the respective cables passing over the spaced pulleys.

8. A harvesting machine according to claim 4 wherein:
said conveyor means includes a second frame having first and second elongated frame sections,
means pivotally mounting one end of said first frame section of said second frame on said chassis, for rotation about a first axis between a first position extending transversely from said chassis and a second position folded adjacent said chassis,
means pivotally mounting one end of said second frame section of said second frame of swinging movement on the opposite end of said first frame section about a second axis, between a first position extending transversely from said chassis in substantial longitudinal alignment with said first frame section, and a second position adjacent said chassis and generally parallel to said first frame section of said second frame, and
a second cable and pulley system for supporting said second frame and for rotating said first and second frame sections thereof to folded positions adjacent said chassis, said second cable and pulley supporting system being operable independently of said first cable and pulley supporting system, said first-mentioned frame and said second frame being mounted on opposite sides of said chassis.

9. A harvesting machine according to claim 4 wherein:
each of said cable and pulley systems includes
a first cable attached to one of said first frame sections,
a second cable attached to one of said second frame sections,
means for moving said first and second cables to rotate said first and second frame sections, and
spaced pulley means for causing said first cable to move at a faster rate than said second cable.

10. A harvesting machine according to claim 4 wherein:
each of said first cables is slack when the first frame section to which it is attached is in its transversely extended position.

11. A harvesting machine according to claim 4 wherein:
each of said cable and pulley systems includes
a conveyor frame folding cable having one end fixed to one of said second frame sections and the other end fixed to said chassis, said folding cable supporting said one second frame section during at least part of its movement to its folded position.

12. A harvesting machine for use in the field harvesting of produce, the machine comprising:
a chassis,
means mounting said chassis for movement over the ground,
conveyor means for transporting the produce from an outwardly spaced position to said chassis, said conveyor means including a first frame having first and second elongated frame sections,
means pivotally mounting one end of said first frame section on said chassis for rotation about a first axis, between a first position extending generally transversely of said chassis and a second position folded adjacent said chassis,
means pivotally mounting one end of said second frame section for swinging movement on the opposite end of said first frame section about a second axis, between a first position extending transversely from said chassis in substantial longitudinal alignment with said first frame section and a folded second position adjacent said chassis and generally parallel to said first frame section, and
a cable and pulley system for supporting said frame with said first and second frame sections in substantial longitudinal alignment, and for rotating said first and second frame section about said first and second axes to folded position adjacent said chassis, said first axis and said second axis being generally horizontal;

said conveyor means including a single conveyor belt extending about said first frame section and said second frame section, an inclined conveyor for transporting produce from said single conveyor belt to a loading position, an extent of said inclined conveyor passing beneath said single conveyor belt, and a plurality of rollers mounted across the path of said single conveyor, the centerlines of said rollers defining a gradual curve to deflect the produce from said single conveyor belt to said inclined conveyor.

13. A harvesting machine according to claim 12 wherein:

said conveyor means includes idle rollers on the underneath side of said first and second frame sections, said conveyor belt passing between said idle rollers and said frame sections.